J. C. KING.
ELECTRODE.
APPLICATION FILED MAR. 21, 1917. RENEWED APR. 7, 1919.
1,322,491.
Patented Nov. 18, 1919.
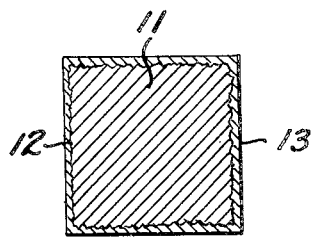
Inventor
J. C. King
By
Fetherstonhaugh Co
Attys.

UNITED STATES PATENT OFFICE.

JESSE C. KING, OF MONTREAL, QUEBEC, CANADA.

ELECTRODE.

1,322,491.  Specification of Letters Patent.  Patented Nov. 18, 1919.

Application filed March 21, 1917, Serial No. 156,442. Renewed April 7, 1919. Serial No. 288,219.

*To all whom it may concern:*

Be it known that I, JESSE C. KING, a citizen of the United States, and resident of the city of Montreal, in the Province of Quebec and Dominion of Canada, have invented certain new and useful Improvements in Electrodes, of which the following is a full, clear, and exact description.

This invention relates to improvements in electrodes for use in electric furnaces and the like, and the object of the invention is to provide an electrode having on the outer surface thereof a thin coating of material designed to protect the body of the electrode at all parts of the surface not in actual operation.

Carbon electrodes, when used in electric furnaces or the like, become heated to high temperatures for a considerable distance from the active end, and this high temperature renders the carbon more or less combinable with oxygen or other gases, with the result that the electrode burns away very rapidly, thus reducing the sectional area and consequently altering the resistance and conductivity of the electrode.

My invention is designed to cover the surface of the electrode with a thin coating of incombustible material, so that wasting away will be limited to the normal waste caused by the passage of the arc. I have found that a mixture of silica and graphite is suitable for this purpose, and this mixture may be applied in the manner described in my copending application, Serial Number 99,104, filed May 22nd, 1916. After the application of the protective coating, the electrode is preferably baked, so that the electrode and coating become for all practical purposes integral.

Referring to the drawing, which represents a cross sectional view of the electrode with the coating applied thereto, 11 designates the core or electrode proper of carbon having the surface 12 roughened by any suitable means and applied thereto a coating 13, comprising a mixture of silica and graphite. This coating mixture is applied to the carbon core, preferably while the latter is in a plastic condition, and the electrode is then baked to drive off the moisture and gases from the electrode and harden same. The proportions of silica and graphite may vary largely, but for ordinary purposes, I prefer to use a mixture of approximately equal parts of the two ingredients. Pure silica and carbon may be used if the former ingredient can be obtained, but usually commercial silica contains a percentage of alumina or iron, or both, and it is to be understood that my invention covers the use of either pure silica or silica in its ordinary commercial state.

When an electrode thus coated is used in a furnace or other apparatus wherein a large portion of the electrode is subject to high heat and the action of gases, the coating remains substantially inert, as neither the silica nor the graphite will be attacked by oxygen or other gases present. Graphite at high temperatures does not readily combine with oxygen or other gases, but neither graphite nor silica alone would form a perfect coating. A mixture of the two ingredients, however, produces a coating which has approximately the same expansion and contraction as the carbon of the electrode, and the coating is therefore not liable to split or crack and expose portions of the core to the action of gases.

The silica is ground to suitable fineness and is mixed with finely ground graphite in proportions which may range from 25% of silica and 75% of graphite, to 90% of silica and 10% of graphite, but I prefer to use approximately equal proportions by weight of each of the ingredients. This mixture may be molded, pasted, sprayed or pressed on to the roughened carbon core, and when suitably hardened forms an impenetrable coating between the electrode and the gases of the furnace.

Having thus described my invention, what I claim is:—

1. A coating for electrodes comprising a mixture of silica and graphite.

2. A coating for electrodes consisting of a mixture of finely divided silica and finely divided graphite in approximately equal parts by weight.

3. An electrode having a surface coating of from 25 to 90 per cent. silica mixed with from 75 to 10 per cent. graphite respectively substantially as set forth.

In witness whereof, I have hereunto set my hand.

JESSE C. KING.